June 27, 1967  J. W. CRANE  3,327,653
COMPRESSING APPARATUS

Filed Dec. 1, 1961  3 Sheets-Sheet 1

INVENTOR
Jack W. Crane
BY
Joseph G. Brown
ATTORNEY

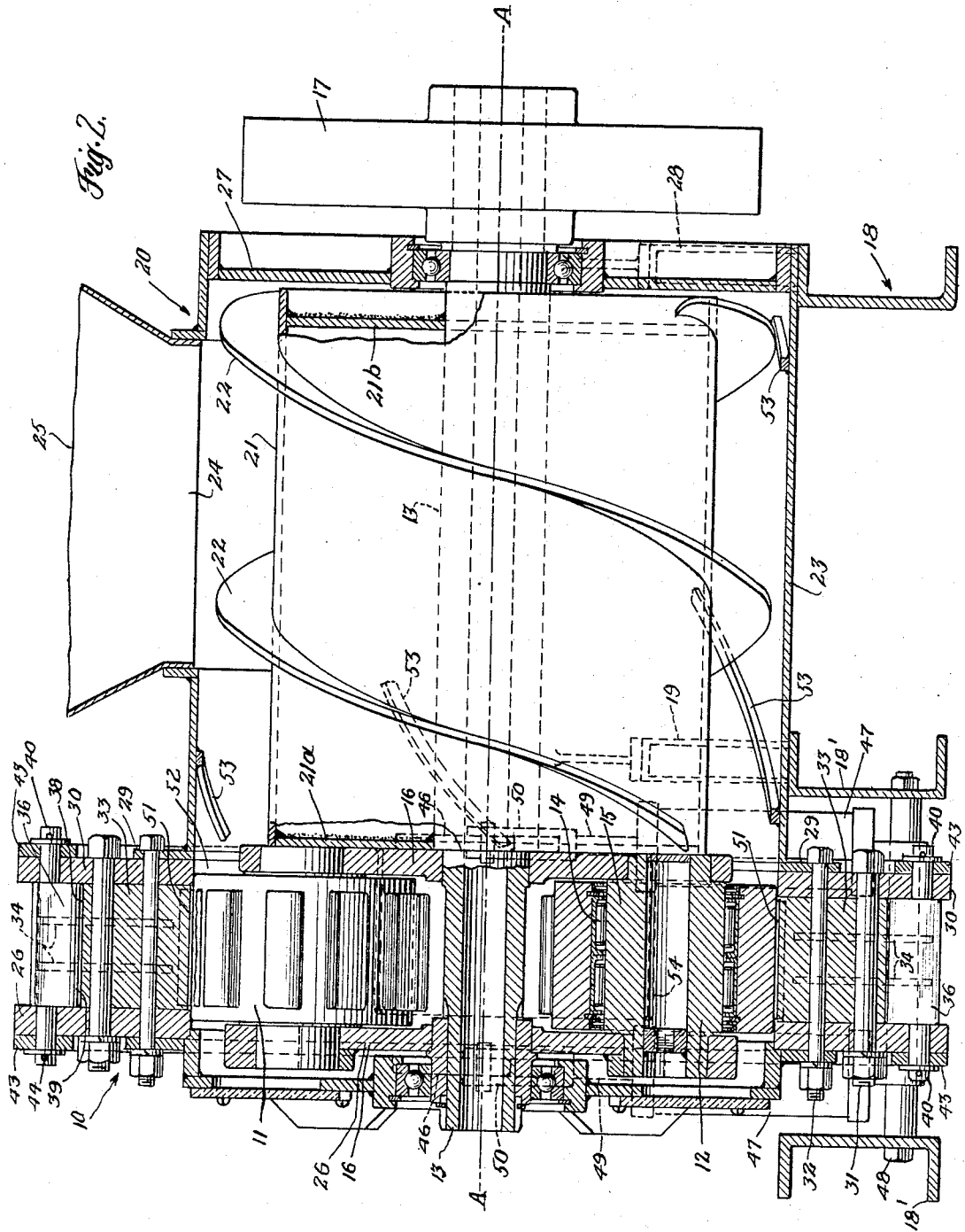

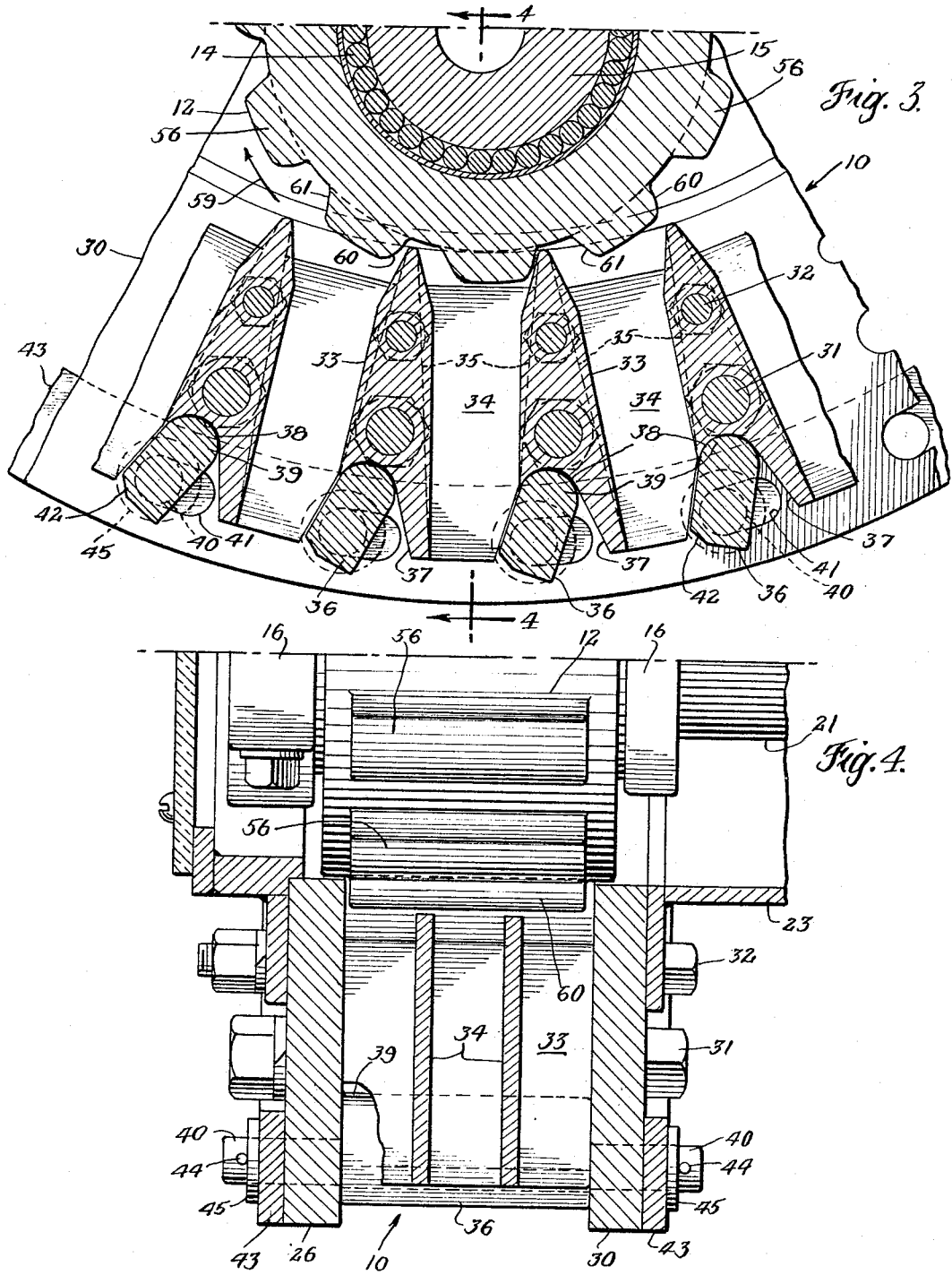

United States Patent Office 3,327,653
Patented June 27, 1967

3,327,653
COMPRESSING APPARATUS
Jack W. Crane, New Holland, Pa., assignor to Sperry Rand Corporation, New Holland, Pa., a corporation of Delaware
Filed Dec. 1, 1961, Ser. No. 156,360
24 Claims. (Cl. 107—14)

My invention relates to a ring die pelleting machine of the type commonly used in the arts of pelleting food for poultry and for cattle. It is more particularly intended for the pelleting of hay fed to it directly from the field. As such it is intended to be mounted upon a suitable chassis which can be tractor drawn or self-propelled and provided with suitable pick-up and other necessarily adjunctive machinery.

Ring die pelleting machines as known to the art comprise a relatively coaxially revolvable ring die and a coacting roller means. In some machines the rolls are revolved and in others the ring die is revolved, while in still others both elements are revolved about the same axis. Many of the features of the machine which I have built and operated are equally applicable to ring die pelleting machines of any one of these three arrangements.

My overall aims are a simplification of such machines, improvement of their ruggedness and durability, the attainment of a greater facility for repairs, an achievement of low maintenance cost, an embodiment in a compact field unit, a minimum weight per horsepower and low cost as compared with piston machines of equal capacity, and a reach to so high an efficiency as to afford the maximum capacity in tons per hour of field operation and therefore a lower operating cost by reason of the lowered horsepower per ton.

In more detail I aim to achieve a compound die construction, composing the dies of the ring of separable unit parts. In this wise quantity production of units, ease of assembly and disassembly, and easier repair and replacement are attained. At the same time there is experienced a greatly improved flexibility of adjustment of the machine during its manufacture to the sizes required to meet various capacity standards.

In the matter of adjustment of the die cross section (commonly called throat adjustment) whether for mere opening and closing of the section or for change of cross section continuously during field operation, I aim for simplicity and strength of the adjustable parts involved, and their mountings, and include a simple mechanical device for simultaneous actuation of the adjustable parts under the relatively high extrusion pressures against which they must act in the changing of the section. The simple, rugged mechanism which I propose attains accuracy of adjustment without sacrifice of positive and certain movements.

Another goal is the improvement in the positiveness and uniformity of the mechanism utilized to feed material to a die ring for pelleting. This I attain by pre-shaping the material mass being fed into the machine while it is yet within the confines of the auger used in the feeding. I pre-shape the material to a ring-like form of an outer diameter substantially of the inner diameter of the die ring and of a ring form thickness enabling the roller means to grip and compress it with the greatest efficiency. A special arrangement of ribs within the auger housing is used to improve distribution of the crop material. Moreover, I provide extensions of the auger body cylinder into the space between the roller means to confine the material fed to the ring to the radial position and form in which it is initially projected into the die ring.

Another object is to improve the rolls which constitute the roll means. I provide them with tooth formations which enter the mouths of the dies and thereby not only drive the rolls positively from the die ring but also improve the efficiency of the feed of the material under the rolls and the positiveness and force of its compression within the dies.

In the accompanying drawings I show the machine of my invention as I have built and operated it.

Of the drawings,

FIG. 2 is an axial cross section taken on the lines 2—2 of FIG. 1 looking in the direction of the applied arrows, but showing one of the two rolls in section in lieu of full lines;

Figure 1:
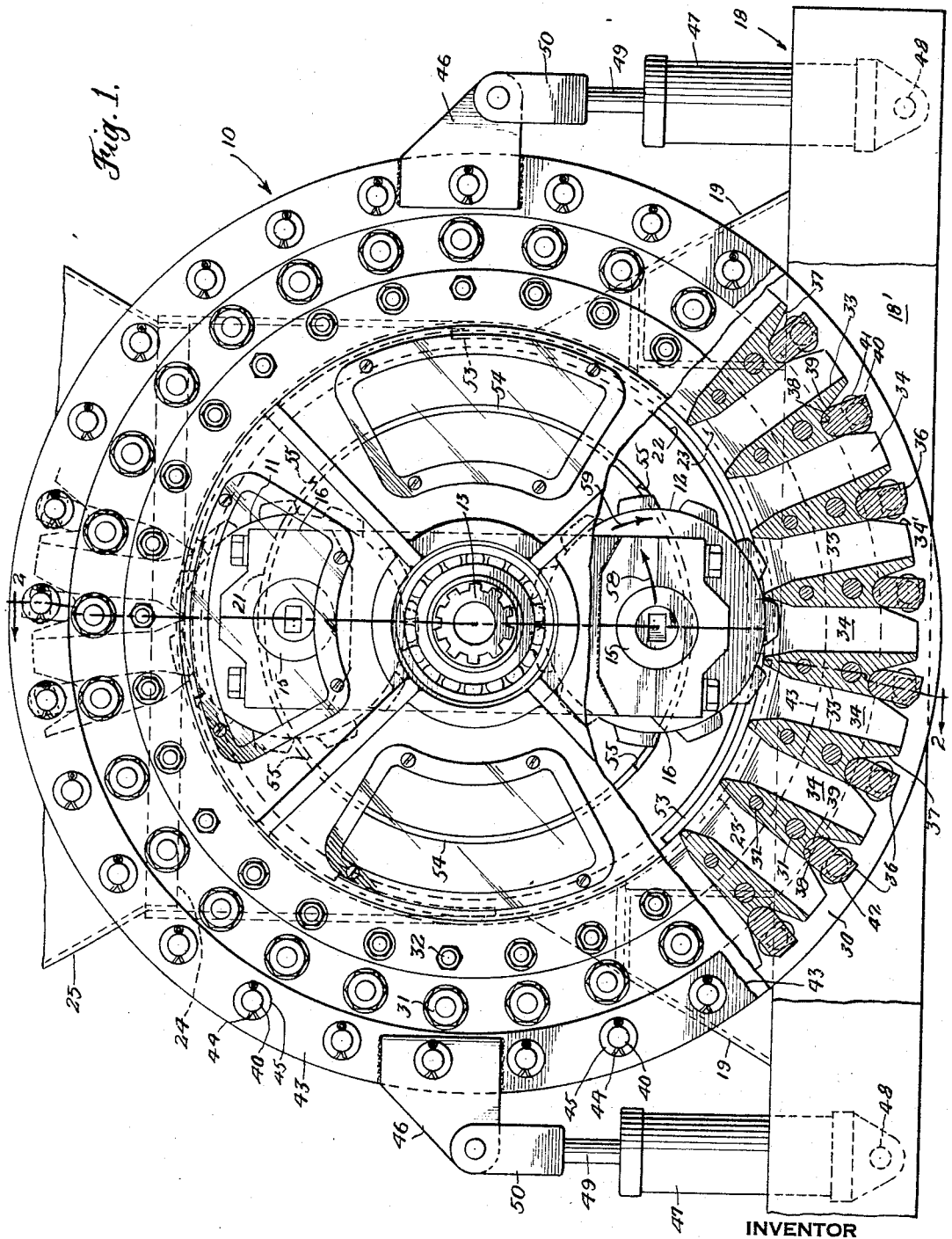
FIG. 1 is a rear end elevation of the machine showing the rear wall broken away, and a portion of the die ring in cross section but the lowermost roll in full lines.

FIG. 3 is an enlargement of that lower portion of FIG. 1 comprehended by the broken lines of the rear wall of the die ring, but showing more detail, the additional detail including an enlarged cross section of the lower roll and an adjustment of the die cross section adjusting means to a position of minimum die cross section; and FIG. 4 is an axially extending cross section on the line 4—4 of FIG. 3.

Following now the drawings and paying particular attention to FIGS. 1 and 2 which show the general organization of the ring die pelleter it will be noted that the machine comprehends the ring die designated generally 10 and roll means comprised of a pair of coacting rolls 11 and 12, which elements are revolvable about the axis AA of a hollow shaft 13. The rolls 11 and 12 are mounted diametrically opposite each other to rotate about roller bearings 14 carried on large diameter spindles 15 borne at the outer ends of the diametrically extending bipartite frame 16 keyed to shaft 13 to be revolved about the axis AA of that shaft. A driving member 17 is carried on one end of shaft 13. A suitable prime mover (not shown) connects with member 17 and thus, in this embodiment, the roll means comprising the pair of rolls 11 and 12 is revolved relative to the ring die 10. The ring die is not revolved but is rigidly supported from the central channel 18' of chassis frame 18 of the machine through saddle braces indicated at 19 connecting with a housing 23, which has a flanged connection 29 with a ring wall 30.

The machine also includes auger means designated generally 20 for feeding to the die ring the material to be operated upon. This auger per se in general organization is mounted upon and revolved by shaft 13. Supported upon a relatively large diameter body 21 (shown as a cylindrical surface of revolution) there are two auger flights 22. The body 21 is supported from the shaft by welded end heads 21ᵃ and 21ᵇ and these heads are in turn connected by welding to the shaft to be driven thereby. The large diameter housing 23 surrounds the auger and in its top is provided a feed opening 24 through which feed is introduced by hopper 25. The shaft 13 which drives the auger is borne at each of its opposite ends in a suitable bearing, that at the ring end carried by the rear wall 26 of the ring die and that at the other end carried by an end closure 27 of the cylindrical housing 23. The housing itself in turn rests upon and is secured to chassis frame 18 through saddle braces 19 as shown in dotted lines in FIG. 2. At its opposite end its flange 29 is secured by bolts 32 to the front wall 30 of the die ring. As so organized the overall simplicity and compactness of the machine at large together with its suitability for chassis mounting and travel becomes apparent.

The details of parts of the die ring and their organization into the ring together with the advantages afforded by these constructions can best be followed and appreciated by reference to FIGS. 2, 3 and 4. The front and rear walls 30 and 26 of the die ring constitute a pair of clamping plates between which the separable units which embody the die cells are clamped by means of through bolts of the two annular series 31 and 32. The principal elements entering into this compound die construction are the through running partitions 33 wedge-shaped in thickness which are arranged in axial planes and constitute collectively an annularly arranged series of partitions of the space between clamping plate 26 and clamping plate 30. The annular series of through bolts 31 and 32 pass through the bodies of these wedge-shaped partitions, fitting rather closely within their bodies, thereby at the same time that they clamp them together between the plates 26 and 30 anchoring these wedge-shaped partitions against the relatively high radially directed forces encountered. The radially inner ends of these wedge-shaped partitions are tapered more sharply than the main bodies of the wedge-shaped members to sharpen them for better severing of the material which is pushed through the dies by the rolls.

Intermediate the ends of these axially extending partitions are two annular series of relatively thin partition walls 34 located in transaxial planes. They are of uniform thickness but wedge-shaped in width with the smaller end of the wedge directed radially outwardly instead of radially inwardly as in case of the axially extending partitions 33. They are seated against radially outwardly directed extrusion pressures in complemental converged grooves 35 in the juxtaposed faces of adjacent wedges 33. The width of the grooves axially is substantially the thickness of the partitions 34 whereby they are retained axially against dislodgement. Spaced equidistant from each other and from the flanking clamping plates 26 and 30, and thus arranged and secured together, these axially and transaxially extending partitions form a compound die ring comprising three annular series of cell units. Viewed axially rather than annularly this compound construction is comprised of individual cells in multiples of three. The individual parts in their simplicity afford a maximum facility for quantity production at a high rate and a low cost. Simply by substituting shorter axially extending partitions or longer ones as the case may require and using a lesser or a greater number of transaxially extending partitions 34, die rings of greater or less capacity may be organized to meet the varying capacity requirements of the trade.

The means for variably adjusting the cross section of the die cells either to vary the size of the pellets produced or their compactness is comprised of the annular series of adjustable cell wall portions 36 of partitions 33. These cell wall portions are relatively thick yet not so thick as the main bodies of the partitions 33. To accommodate them the outer ends of the partitions 33 are reduced in thickness, being cut away at 37 to receive and socket the adjustable wall portions 36. The radially inner end of the cutaway portion 37 is re-entrantly axially socketed at 38 on the arc of a circle of a radius approximately equal to half the thickness of the adjustable wall portion 36, thereby to receive and seat for angular movement the complementally convexed top edge or side 39 of the adjustable wall portion 36. The cutaway portion 37 of the wedge-shaped partitions 33 is cut away divergently and the adjacent edges of partitions 34 are similarly cut away to give angular freedom of adjustment of the adjustable wall portions 36, for wall portions 36 are through running from clamping plate 26 to clamping plate 30. They are held in place in their radially outwardly re-entrant sockets 38 by means of lateral projections 40 from each end which are extended through the retaining slots 41 in the flanking clamping plates. To facilitate exiting of the pellets and prevent their being preliminarily broken off sharp corners the flanking edges of members 36 are beveled or rounded as indicated at 42. So organized the cross section adjusting means constitutes pressure applying means for compacting the pellets at the same time that their size is regulated. Walls 36 may readily be given ample size and ruggedness to resist the toughest usage without impairment of their functioning. Ample bearing surfacing between relatively movable parts constitutes an assurance against undue wear. At the same time the smooth passage of the pellet from mouth to discharge throat of a die cell is assured by the relatively close fitting bearings and joints free from disrupting interstices and obstructing surfaces.

Simultaneity of operation of the walls 36 for accurate adjustment of die cell cross section to the same dimensions throughout the annular series or die cells is attained by mechanically interconnecting them commonly on each side of the die ring to annularly extending adjusting rings 43. This connection is simply had by extending the lateral projections 40 through holes in these two rings 43 and binding the rings in place alongside of the die ring faces by cotter pins 44 passed through the projections 40 and bearing upon the rings through intervened washers 45. For each ring 43 there are provided a pair of hydraulic cylinders 47 oscillatably secured at one end to parallel channels 18′, 18′ of chassis 18 by bolts 48 and connected at their opposite ends through piston rods 49 and clevises 50 to the brackets 46 carried by the ring at diametrically opposite points. When hydraulic pressure (or other fluid pressure) is applied simultaneously to opposite ends of the cylinder pairs in the proper directions, the rings 43 with which they are connected are moved by them either clockwise or counterclockwise, clockwise (viewed from FIG. 1) to simultaneously reduce the cross sections of all the die cells equally, and counterclockwise to simultaneously open the cross sections of all the die cells equally. Because the adjustable wall portions 36 are through running from the rear wall 26 to the front wall 30 of the die ring this adjustment of each wall portion 36 commonly serves the three axially aligned die cells which are traversed by it, each transaxial partition 34 being cut away at 34′ to accommodate this transverse adjustment of the adjustable wall portion 36. Freedom of movement of portions 36 in all positions of adjustment is assured by fixing their radial dimensions to bottom the projections 40 in slots 41 only when the adjustment is centrally of slots 41, thus introducing the clearances from sockets 38 which appear in FIGS. 1 and 3 when the operation is toward either extreme.

Another of the goals I have sought is the improvement in the positiveness and uniformity of the operation involved in feeding material to the die ring for pelleting. I pre-form the material into a segmental ring-shape of substantially uniform thickness, of an external diameter approaching the internal diameter of the ring, and use a thickness preferably not exceeding one-third of the diameter of the rolls of the roll means, but a thickness between one-fourth and one-third of the diameter of the roll may be used. Pre-shaping the material to this form and to these proportions and maintaining them after the material is projected into the die ring by the auger is achieved in the following manner.

Referring to FIGS. 1 and 2, the cylindrical auger housing 23 is made of a diameter approaching the internal diameter of the die ring but preferably slightly less, having reference particularly to the internal diameter of the die cell portion of the ring. This is in order to provide room for a pre-compressed circumferential band of material which in all cases overlies the material being fed in, affords the roll bodies adequate clearance from the lips of the die, and assures a better shearing action of the material entering the mouths of the dies. Such a clearance is indicated at 51 in FIG. 2. It is flanked on both sides by the inwardly projecting edges of the walls 30 and 26. The auger flights 22 in turn are supported by a surface of revolution 21 which in this case is in the form of a cylinder but in other cases other forms may be preferred. The diameter of this surface of revolution at its inner end adjoining die ring 10 is less than the internal diameter of housing 23 by twice the depth or thickness of the material desired to be fed to the ring. Expressed in terms of relative radii, the radius of the surface of revolution 21 at the die ring opening 52 through which the material is fed to the ring is less than the radius of the auger housing 23 or the internal radius of the die ring by from one-fourth to one-third of the diameter of the rolls coacting with the die ring. In height the auger flights 22 approximate a height equal to one-fourth or one-third of the diameter of the rolls, but as shown they are of somewhat less height in order to leave room for the spirally extending fixed ribs 53 within the auger housing 23. These ribs are relatively shallow and have such direction with respect to the pitch of the auger flights that they coact with the auger flights to steer the material, While all of the spirally extending ribs 53 terminate near the ring die end of the auger housing, each successive rib, starting with the rib closest to the hopper feed opening 24 and progressing circumferentially around the housing in the direction of rotation of the auger, extends a greater distance outwardly from the die ring than the preceding rib. This proportioning of the ribs affords a nearly uniform distribution of the material fed to the die ring. Material from the hopper axially nearest the die ring is engaged with the shorter ribs 53 and steered to near regions of the die ring while material from axially more distant portions of the hopper is progressively engaged with ribs of greater length and steered progressively to circumferentially more distant regions of the die ring in the direction of auger rotation. Thus there is formed about the auger and fed directly through the die ring opening 52 toward the spaces between the rollers segments of material of ring form of the dimensions most suitable for best roll nip and compressing action. Once projected within the die ring into the spaces between the rollers, this form is retained by segmental cylindrical extensions 54 (FIGS. 1 and 2) from the auger cylinder 21 into the spaces between the rollers of the die ring. Extensions 54 are of the same diameter as the inner end of the auger cylinder 21. They are extended near to rear wall 26 of the die ring, and reach as clearly indicated at 55 in FIG. 1 substantially from roll face to roll face.

Relatively shallow depth ring-shaped bands of material delivered from the auger cylinder 21 to the die ring are projected over the extensions 54 all the way across the width of the die ring and coacting rolls. Its shape, as delivered, is retained between extensions 54 and the inner periphery of the die ring itself (or the relatively thinner circumferential band of pre-compressed material which lies within it in space 51). These bands have a form and thickness which enhance the grip of the rolls upon the material as it enters their nip. The outer periphery of such a band of material engages with the surface of the circumferentially extending material within the ring and this engagement tends to hold the material until the revolving rolls overtake it. (In case of a rotating die ring and fixed rolls such engagement would tend to carry the material along with the ring and into the rolls.) The unobstructed and preferably smooth surface of extensions 54 passes under the material so held without consequential friction.

The roll means 10 appears in all the figures but the details of the improvement of them and their action which has been my object is best shown in FIG. 3. FIG. 4 adds to this showing. Each of the rolls 11 and 12 is provided with tooth-like formations 56 of a height enabling them to enter the mouths of the dies to an appreciable depth. These formations extend substantially from inner face to inner face of the ring die walls 26 and 30 and thus across the transaxial die cell partitions 33. These partitions 33 permit free entry of the teeth into the die mouths without interference. Alternatively I may transaxially groove the tooth-like formations to receive the upper edges of the partitions 34. Revolution of the rolls about the axes of spindles 15 being counterclockwise as shown in FIG. 1 by the arrow 58, the formations 56 engage with the lips of the die cells formed by the higher upper edges of the partitions 33 and the rolls themselves are through such engagement positively driven clockwise as indicated by the arrow 59. Engaging sides 60 of the tooth-like formations are of a shape suitably complemental to these lips for best driving engagement. The opposite sides 61 of formations 56 are of a less abrupt slope better to give the clearance which insures the proper gear-like action and to improve the materials cutting action of the pointed ends of the partitions 33. Material engaging and compression action of these sides 61 is the better because of their relatively great breadth. This breadth approaches the width of the die mouth. The corners of these two formations adjoining their broad compressing heads are appropriately rounded.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a ring die pelleting machine of the type comprising a die ring and coacting roller means relatively revolvable about a common axis for pelleting crop material and the like, a die ring comprising an annular series of die cells having walls extending radially with respect to said axis, a pair of axially spaced clamping plates supporting said series of cell walls therebetween, certain of said cell walls having radially re-entrant transversely extending radially open sockets, radially extending cell wall portions adjustably seated in said sockets for movement transversely of the die cells, said clamping plates having a plurality of slots therein, and said cell wall portions having lateral projections extended through said slots to retain said cell wall portions seated in said sockets.

2. In a pelleting machine of the type comprising a die ring and coacting roller means relatively revolvable about a common axis for pelleting crop material and the like, a die ring comprising a multiple number of anularly arranged series of die cells having walls extending radially with respect to said axis, a pair of axially spaced clamping plates supporting said cell walls therebetween, and means for changing the cross sections of the cells comprising angularly adjustable radially outer wall portions common each to a plurality of cells.

3. In a pelleting machine according to claim 2 in which the annularly arranged die cells comprise cells in multiple number in axial alignment, said angularly adjustable wall portions having axially spaced ends, and means at each axial end of said adjustable wall portions for adjusting the wall portion.

4. In a pelleting machine according to claim 3, in which said means at each axial end of the adjustable wall portions for adjusting the wall portions comprises an annular ring having one side commonly connected with each of the adjustable wall portions.

5. In a ring die pelleting machine of the type comprising relatively revolving, coaxial die ring and coacting anularly spaced apart roller means for pelleting crop material and the like, an auger the outer diameter of which is approximately the same as the internal diameter of the die ring, which auger is revolved about the axis of the die ring to feed material to be pelleted to the annularly extending spaces between the roller means, a housing, said auger having an external auger flight and an internal surface of revolution between which and the housing the flight of the auger is embraced, the housing being of an internal diameter substantially the same as the internal diameter of the die ring and said surface of revolution being of a relatively large diameter approaching the internal diameter of the die ring but less at least by the height of the auger flight, together with axial projections from the auger surface extending substantially to the far side of the ring and from roller face to roller face.

6. In a ring die pelleter according to claim 5 in which the flight of the auger terminates in a transaxial plane external to the ring and the said projections are smooth surfaced.

7. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; shaft means journaled by the support means coaxially with the annulus and extending axially at opposite sides of the wheel; wheel mounting means carried by the shaft means for rotation therewith and including radial members closely adjacent to opposite sides of the wheel and journaling the wheel; and means for feeding material to the annulus, including a housing carried by the support means at one side of the annulus and having a cylindrical wall coaxially adjoining the annulus and of an inside diameter on the order of that of the annulus inner periphery, and a rotary feed element coaxially within the housing and having a cylindrical core substantially coextensive in length with the housing wall and carried by and for rotation with the shaft means, said core having an outer surface of a diameter smaller than that of said housing wall but large enough to lie radially outwardly of the press wheel axis, said core further having a press-wheel-proximate end portion and a helical flight fixed to said core and operative in the annular space between the housing wall and the core surface, said flight having a terminal end closely axially adjacent to the press wheel at said one side of the annulus.

8. A ring die pelleting machine comprising relatively coaxially revolving die ring and coacting roller means arranged to provide a material-receiving space between them, an auger having an auger flight the outer diameter of which is substantially the same as the internal diameter of the die ring and an auger core providing a surface of revolution of less diameter than said flight, which auger is revolved about the axis of the die ring to feed material to be pelleted to said space, an external auger flight housing concentric with said surface of revolution and between which and said surface the flight of the auger is embraced, the housing being of an internal diameter substantially the internal diameter of the die ring and said surface of revolution being of a relatively large diameter approaching the internal diameter of the die ring but less at least by the height of the auger flight, together with axial projection means from the auger core surface of revolution extending substantially to the far side of the ring in at least partially enclosing relation to the roller means.

9. In a machine for wafering forage crops and the like, the combination of: support means; die means in the form of an annulus fixedly carried by the support means on a generally horizontal axis and including a plurality of circumferentially spaced die cells and an inner peripheral track from which said cells radiate; means including a press wheel arranged eccentrically within the track for orbital movement about the annulus axis so that the periphery of the wheel substantially rolls on said track; a feed housing alined with the annulus on the axis thereof and having a first end substantially in axial register with the track and a second end spaced axially from the track and further having an annular wall and a feed opening axially offset from the track for enabling the introduction of forage crops into said housing; and crop control structure in the housing for feeding such crops axially to the track, including rotary means rotatable in the housing generally coaxially with the track and extending substantially from said feed opening to the first end of said housing in annularly spaced relation to the interior surface of said annular wall, and fixed means secured to the interior surface of said wall in at least partially embracing relation to said rotary means, said fixed means including a plurality of circumferentially spaced apart feed control elements directed both axially and circumferentially of the housing along a spiral path which advances toward the track in a rotative sense corresponding to the direction of rotation of the rotary means and terminating generally at the track in circumferentially spaced apart relation, said two means of the crop control structure cooperating to cause forage crops to rotate as well as to move axially in the housing for effecting relatively even distribution of such crops to the track substantially throughout its annular extent.

10. In a wafering machine, the combination of support means; die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; shaft means journalled by the support means coaxially with the annulus and extending axially at at least one side of the wheel; radial wheel mounting means carried by the shaft means for rotation therewith and including a member at said one side of the wheel and journaling the wheel; and means for feeding material to the annulus, including a housing carried by the support means at said one side of the wheel and having a cylindrical wall coaxially adjoining the annulus and of an inside diameter on the order of that of the annulus inner periphery, and a rotary feed element coaxially within the housing and having a cylindrical core substantially coextensive in length with the housing wall and carried by and for rotation with the shaft means, said core having an outer surface of a radius smaller than that of said housing wall but large enough to lie radially outwardly of the press wheel axis, said core further having a press-wheel-proximate end portion terminating at said radial means in the area in which the press wheel extends radially beyond the core surface and said end portion having an axial extension projecting axially beyond the aforesaid member of the radial wheel mounting means as an arcuate shield for the press wheeel in at least a portion of the area in which said wheel lies radially inwardly of said core surface, and said core having fixed thereon a helical flight operative in the annular space between the housing wall and the core surface and having a peripheral edge in close-running relationship to the interior surface of said housing wall, said flight having a delivery end terminating closely adjacent to said one side of the wheel.

11. In a wafering machine, the combination of support means, die means in the form of an annulus carried by the support means and including a plurality of uniformly circumferentially spaced generally radial die openings and an inner periphery from which said openings radiate; a circular press wheel arranged eccentrically within said periphery to orbit about the axis of the annulus with the outer periphery of said wheel substantially in rolling contact with the annulus periphery to force material into said openings; shaft means journalled by the support means coaxially with the annulus and extending axially at opposite sides of the wheel; wheel mounting means carried by the shaft means for rotation therewith and including radial members closely adjacent to opposite sides of the wheel and journaling the wheel; and means for feeding material to the annulus, including a housing carried by the support means at one side of the annulus and having a cylindrical wall coaxially adjoining the annulus and of an inside diameter on the order of that of the annulus inner periphery, and a rotary feed element coaxially within the housing and having a cylindrical core substantially coextensive in length with the housing wall and carried by and for rotation with the shaft means, said core having an outer surface of a diameter smaller than that of said housing wall but large enough to lie radially outwardly of the press wheel axis, said core further having a press-wheel-proximate end portion and a helical flight fixed to said core and operative in the annular space between the housing wall and the core surface and having a peripheral edge in close-running relationship to the interior surface of said housing wall, said flight having a terminal end closely axially adjacent to the press wheel at said one side of the annulus.

12. In a machine for wafering forage crops and the like, the combination of: support means; die means in the form of an annulus fixedly carried by the support means on a generally horizontal axis and including a plurality of circumferentially spaced die cells and an inner peripheral track from which said cells radiate; means including a press wheel arranged eccentrically within the track for orbital movement about the annulus axis so that the periphery of the wheel substantially rolls on said track; a feed housing alined with the annulus on the axis thereof and having a first end substantially in axial register with the track and a second end spaced axially from the track and further having an annular wall and a feed opening axially offset from the track for enabling the introduction of forage crops into said housing; and crop control structure in the housing for feeding such crops axially to the track, including rotary means rotatable in the housing generally coaxially with the track and extending substantially from said feed opening to the first end of said housing in annularly spaced relation to the interior surface of said annular wall, and fixed means secured to the interior surface of said wall in at least partially embracing relation to said rotary means and including at least one feed control element starting at the feed opening and directed both axially and circumferentially of the housing along a spiral path which advances toward the track in a rotative sense corresponding to the direction of rotation of the rotary means and terminating generally at an upper portion of the track, said two means of the crop control structure cooperating to cause forage crops to rotate as well as to move axially in the housing for effecting relatively even distribution of such crops to the track substantially throughout its annular extent.

13. The invention defined in claim 12, in which: the rotary means has at least one crop-engaging blade element thereon.

14. The invention defined in claim 13, in which: said blade element is shaped at least in part as part of a relatively long-pitch helix about the axis of said rotary means.

15. The invention defined in claim 12, in which: the rotary means has a plurality of blade elements thereon in circumferentially spaced relation.

16. The invention defined in claim 15, in which: each of said blade elements is shaped at least in part as part of a relatively long-pitch helix about the axis of said rotary means.

17. The invention defined in claim 9, in which: the elements terminate at the track in at least an upper portion thereof.

18. The invention defined in claim 9, in which: the rotary means has at least one crop-engaging blade element thereon.

19. The invention defined in claim 18, in which: said blade element is shaped at least in part as part of a helix about the axis of said rotary means.

20. The invention defined in claim 9, in which: the rotary means has a plurality of blade elements thereon in circumferentially spaced relation.

21. The invention defined in claim 20, in which: each of said blade elements is shaped at least in part as part of a helix about the axis of said rotary means.

22. In a machine for wafering forage crops and the like, the combination of: support means; die means in the form of an annulus fixedly carried by the support means on a generally horizontal axis and including a plurality of circumferentially spaced die cells and an inner peripheral track from which said cells radiate; means including a press wheel arranged eccentrically within the track for orbital movement about the annulus axis so that the periphery of the wheel substantially rolls on said track; a feed housing alined with the annulus on the axis thereof and having a first end substantially in axial register with the track and a second end spaced axially from the track and further having an annular wall and a feed opening axially offset from the track for enabling the introduction of forage crops into said housing; and crop control structure in the housing for feeding such crops axially to the track, including rotary means rotatable in the housing generally coaxially with the track and extending substantially from said feed opening to the first end of said housing, said rotary means having a plurality of blade elements thereon spaced circumferentially thereof and extending radially in annularly spaced relation to the interior surface of said annular wall, and fixed means secured to the interior surface of said wall in at least partially embracing relation to said rotary means, said fixed means including a plurality of elements spaced apart circumferentially and extending lengthwise of said housing and terminating at the track in circumferentially spaced apart relation, certain of said elements extending circumferentially as well as axially, said two means of the crop control structure cooperating to cause forage crops to rotate as well as to move axially in the housing for effecting relatively even distribution of such crops to the track substantially throughout its annular extent.

23. In a machine for wafering forage crops and the like, the combination of: support means; die means in the form of an annulus fixedly carried by the support means on a generally horizontal axis and including a plurality of circumferentially spaced die cells and an inner peripheral track from which said cells radiate; means including a press wheel arranged eccentrically within the track for orbital movement about the annulus axis so that the periphery of the wheel substantially rolls on said track; a feed housing alined with the annulus on the axis thereof and having a first end substantially in axial register with the track and a second end spaced axially from the track and further having an annular wall and a feed opening axially offset from the track for enabling the introduction of forage crops into said housing; and crop control structure in the housing for feeding such crops axially to the track, including rotary means rotatable in the housing generally coaxially with the track and extending substantially from said feed opening to the first end of said housing, said rotary means having at least one blade element thereon extending axially thereof and projecting radially in annularly spaced relation to the interior surface of said annular wall, and fixed means secured to the interior surface of said wall in at least partially embracing relation to said rotary means, said fixed means including a plurality of elements spaced apart circumferentially and extending lengthwise of said housing in at least partly spiral fashion in the direction of rotation of said rotary means and terminating at the track in circumferentially spaced apart relation, certain of said elements extending circumferentially as well as axially, said two means of the crop control structure cooperating to cause forage crops to rotate as well as to move axially in the housing for effecting relatively even distribution of such crops to the track substantially throughout its annular extent.

24. The invention defined in claim 23, in which: said blade element on the rotary means is shaped at least in part of follow a helix about the axis of said rotary means.

References Cited

UNITED STATES PATENTS

| | | | |
|---|---|---|---|
| 729,149 | 5/1903 | Fenn | 25—12 |
| 1,127,925 | 2/1915 | Schueler | 107—8.35 |
| 1,238,987 | 9/1917 | Barton | 100—95 |
| 1,467,883 | 9/1923 | Sizer | 107—14 |
| 1,804,283 | 5/1931 | Sizer | 107—8.35 |
| 2,148,003 | 2/1939 | Wurtzel | 25—17 X |
| 2,646,594 | 7/1953 | Field | 18—12 |
| 2,798,444 | 7/1957 | Meakin | 107—14 |
| 2,902,949 | 9/1959 | Meakin | 107—14 |
| 2,910,726 | 11/1959 | Parshall et al. | 107—14 X |
| 2,958,900 | 11/1960 | Meakin | 18—12 |
| 2,984,173 | 5/1961 | Roche et al. | 107—14 X |
| 3,006,272 | 10/1961 | Brady | 100—93 |
| 3,149,585 | 9/1964 | Forth et al. | 107—14 |
| 3,203,366 | 8/1965 | Lundell | 107—14 |

FOREIGN PATENTS

| | | |
|---|---|---|
| 918,288 | 10/1946 | France. |
| 374,856 | 6/1932 | Great Britain. |
| 347,637 | 8/1960 | Switzerland. |

WALTER A. SCHELL, *Primary Examiner*.

JOSEPH D. SEERS, CHARLES A. WILLMUTH, *Examiners*.

C. J. FRIBERG, J. SHEA, *Assistant Examiners*.